Patented Nov. 26, 1929

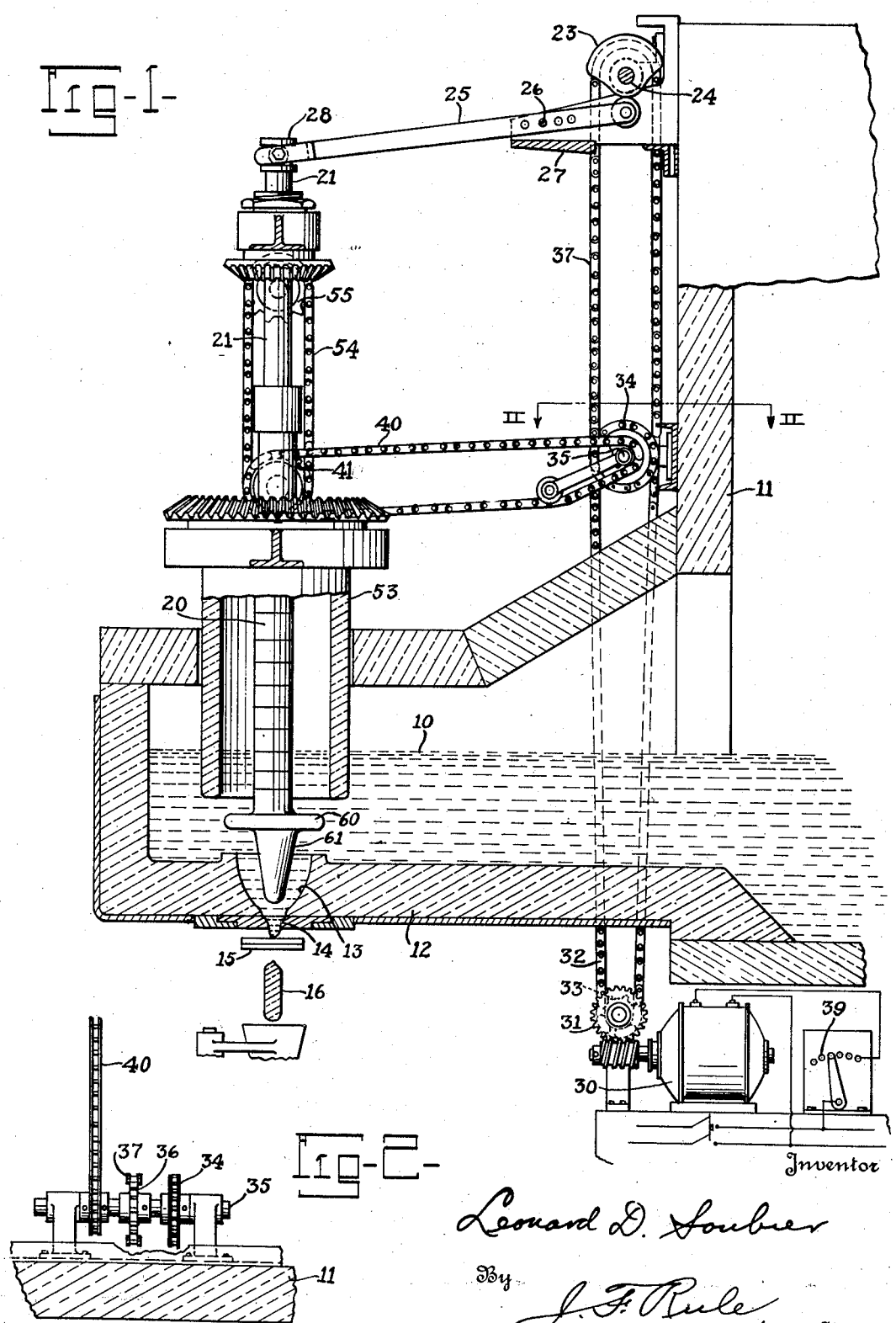

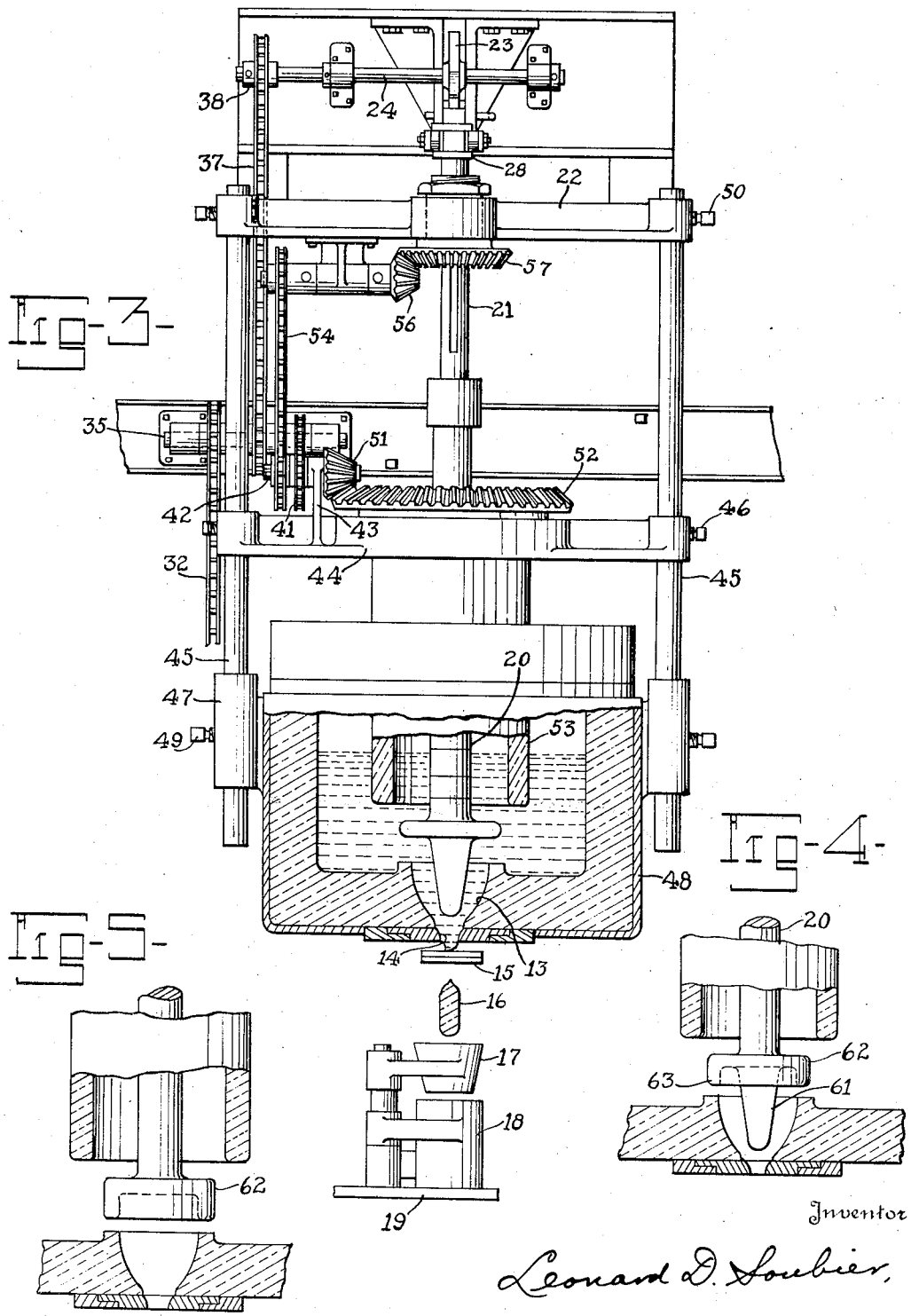

1,737,525

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed October 26, 1927. Serial No. 228,736.

My invention relates to apparatus for feeding mold charges from a supply body of molten glass and shaping the charges. More particularly, the invention relates to a glass feeder of the type in which the glass is delivered through a bottom outlet in a container, the discharge of glass being controlled by a plunger reciprocating in the glass over the outlet.

An object of the invention is to provide improved means for stirring the glass to thereby eliminate cold streaks and secure uniform temperature and homogeneity of the glass.

A further object of the invention is to provide in a feeder of the type indicated, an implement rotating in one direction for stirring, and a cooperating implement rotating in the reverse direction, also serving to stir the glass and to render the stirring action of the first implement more effective, while at the same time counteracting the tendency to rotative movement of the glass passing through the outlet.

Other objects of the invention will appear hereinafter.

Referring to the accompanying drawings:

Fig. 1 is a sectional side elevation of apparatus embodying the principles of my invention.

Fig. 2 is a fragmentary sectional plan at the plane of the line II—II on Fig. 1.

Fig. 3 is a part sectional front elevation of the apparatus.

Fig. 4 is a fragmentary view showing a modified form of plunger.

Fig. 5 is a similar view showing a further modification of the plunger.

Molten glass 10 is continuously supplied from a furnace tank 11 to the container 12 which may be the usual forehearth or furnace extension. The floor of the container is formed with a well 13 having downwardly convergent walls terminating in an outlet orifice 14 through which the glass issues. Shears 15 operate periodically to sever the formed charges 16 suspended from the walls of the outlet orifice and permit them to drop through funnel guides 17 into molds 18 on the mold carriage 19.

The discharge of glass is controlled by a plunger 20 which projects downwardly into the glass over the outlet and is periodically reciprocated vertically to control the discharge in a well understood manner. The plunger 20 is secured to a stem or shaft 21 which extends upward through a horizontal beam 22 and has a bearing therein permitting reciprocation and rotation of the plunger. The plunger is reciprocated by means of a cam 23 on a continuously rotating cam shaft 24, said cam operating through a lever 25 fulcrumed at 26 to a stationary bracket 27. The lever 25 has a connection 28 at its forward end with the plunger stem 21.

An electric motor 30 operates through speed reduction gearing 31 to drive a sprocket chain 32 which runs on a lower sprocket wheel 33 and an upper sprocket wheel 34. The latter is keyed to a countershaft 35 on which is also mounted a sprocket wheel 36. A sprocket chain 37 running on the wheel 36, drives a sprocket wheel 38 on the cam shaft 24 for driving the latter. The speed of the motor 30 may be regulated by a rheostat 39. Said motor may also have driving connections with the mold carriage 19 so that the movement of the molds thereon to charge receiving position is synchronized with the operations of the feeding mechanism including the plunger reciprocation and operation of the shears 15.

A horizontally disposed sprocket chain 40 runs over a sprocket wheel on the countershaft 35 and drives a sprocket 41 on a shaft 42 journalled in a bracket arm 43 formed on a frame member or yoke 44. Said yoke is mounted on vertical standards 45, being adjustable on said standards and held in adjusted position by set screws 46. The standards 45 are adjustable vertically in bearing sleeves 47 on the frame or casing 48 which supports the forehearth 12. The standards 45 and parts carried thereby are adjustable vertically and held in adjusted position by set screws 49. The beam 22 is adjustably supported on the standards 45 and held in adjusted position by set screws 50.

Fixed on the shaft 42 is a pinion 51 which drives a bevel gear 52 attached to and forming part of a stirring implement 53. This implement comprises a tube or sleeve surrounding the plunger and projecting downward into the glass, and is continuously rotated by means of the driving connections with the motor 30 as above described.

A sprocket chain 54 is driven by a sprocket wheel on the shaft 42 and drives a sprocket 55 on a countershaft which carries a pinion 56 running in mesh with a gear 57 splined on the plunger shaft 21. The plunger is thereby rotated continuously. It will be noted that the plunger 20 and the stirring sleeve 53 are rotated in opposite directions. The stirring action on the glass is thus rendered very effective. As the two rotating implements 20 and 53 are arranged concentrically, the tendency of the plunger to impart a spiral or rotary movement to the portion of glass passing through the outlet orifice 14, is counteracted by the tendency of the tube 53 to impart a rotary movement to the glass at the outlet in the opposite direction. That is to say, these two opposing forces are neutralized so that there is no twisting or spiral movement of the issuing glass. The tendency towards a one sided flow of the glass from the main tank forward through the channel or forehearth 12, which is ordinarily present in a feeder comprising a single rotating element, is substantially overcome or neutralized in the present construction. It will be noted that in the particular construction shown, the gearing, particularly the gears 57 and 52, are so proportioned that the angular movement of the plunger is faster than that of the tube. The stirring action of the plunger is thus rendered equally effective with that of the tube, although the latter has a greater area acting on the glass. By making the gears 52 and 57 of equal diameter, the tube and plunger will be rotated at the same angular speed, or the gears may be proportioned to rotate the plunger at a slower speed than the tube. The relative speeds of the plunger and tube, required to give the best results, depend on the design and relative arrangement of said parts, and on other factors which vary in practice, depending on the size of ware being made, kind of glass used, etc. The lower end of the plunger 20 is formed with a head comprising a disk-like enlargement 60, below which is a tapered end portion 61. The disk 60 increases the effectiveness of the plunger in its expelling and retarding action as it moves down and up, and also its effectiveness as a means for stirring the glass.

Fig. 4 shows a modification of the plunger, which in this instance is provided with a head 62 having a depending peripheral flange portion 63, so that said head is in the form of an inverted cup with a central depending tip 61.

Fig. 5 shows a further modification in which the plunger tip 61 is omitted, the head being in the form of a bell or inverted cup.

Other modifications may be resorted to within the spirit and scope of my invention.

What I claim is:

1. In apparatus for feeding molten glass, the combintaion of a container having a bottom outlet through which the glass is discharged, stirring implements within the glass in the container, means to rotate said implements simultaneously in opposite directions about a common axis, and means for periodically reciprocating one of said implements toward and from the outlet.

2. In apparatus for feeding molten glass, the combination of a container having a bottom outlet, an implement projecting into the glass over the outlet, means for rotating said implement and periodically reciprocating it toward and from the outlet, a second implement extending into the glass, and means to rotate said second implement in a path surrounding said first mentioned implement and in the opposite direction.

3. In apparatus for feeding molten glass, the combination of a container having a bottom outlet, an implement projecting into the glass over the outlet, means for rotating said implement and periodically reciprocating it toward and from the outlet, a tubular member surrounding said implement, and means for rotating said member about the axis of said implement and in the opposite direction from that in which the implement rotates.

4. In apparatus for feeding molten glass, the combination of a container having a bottom outlet, a plunger projecting into the glass over the outlet, means for periodically reciprocating the plunger toward and from the outlet, a tube projecting into the glass and surrounding the plunger, and means for simultaneously rotating said plunger and tube in opposite directions.

5. In apparatus for feeding molten glass, the combination of a container having a bottom outlet, a plunger projecting into the glass over the outlet, means for periodically reciprocating the plunger toward and from the outlet, a tube projecting into the glass and surrounding the plunger, and means for continuously rotating said plunger and tube in opposite directions at different angular velocities.

6. In apparatus for feeding molten glass, the combination of a container having a bottom outlet, an implement projecting downward into the glass over the outlet, a second implement comprising a tube projecting into the glass and surrounding said first mentioned implement, means for simultaneously rotating said implements in opposite directions, and means for periodically moving one of said implements toward and from the outlet.

Signed at Toledo, in the county of Lucas and State of Ohio, this 24th day of October, 1927.

LEONARD D. SOUBIER.